(12) United States Patent
    Wang

(10) Patent No.: US 9,633,193 B2
(45) Date of Patent: Apr. 25, 2017

(54) SERVER, USER APPARATUS AND TERMINAL DEVICE

(71) Applicant: Otto Wang, Taipei (TW)

(72) Inventor: Otto Wang, Taipei (TW)

( * ) Notice: Subject to any disclaimer, the term of this patent is extended or adjusted under 35 U.S.C. 154(b) by 35 days.

(21) Appl. No.: 14/682,055

(22) Filed: Apr. 8, 2015

(65) Prior Publication Data
    US 2016/0004856 A1    Jan. 7, 2016

(30) Foreign Application Priority Data
    Jul. 4, 2014    (TW) .............................. 103123223 A

(51) Int. Cl.
    *H04L 29/06*    (2006.01)
    *G06F 21/36*    (2013.01)
    *G06F 3/0484*    (2013.01)

(52) U.S. Cl.
    CPC .......... *G06F 21/36* (2013.01); *G06F 3/04842* (2013.01); *G06F 3/04845* (2013.01); *H04L 63/12* (2013.01)

(58) Field of Classification Search
    CPC .. G06F 21/36; G06F 3/04842; G06F 3/04845; H04L 63/12
    USPC ............................................. 726/2, 7, 27, 28
    See application file for complete search history.

(56) References Cited

U.S. PATENT DOCUMENTS 8,713,703 B2    4/2014    Fisk et al.
    2010/0083353 A1*    4/2010    Wang ...................... G06F 21/36
                                                                    726/5
    2011/0208716 A1*    8/2011    Liu .................... G06F 17/30247
                                                                    707/710
    2013/0007875 A1*    1/2013    Jakobsson ............... G06F 21/36
                                                                    726/19
    2013/0091027 A1    4/2013    Lin
    2013/0145441 A1    6/2013    Mujumdar et al.
                        (Continued)

FOREIGN PATENT DOCUMENTS

CN        101923702 A    12/2010
TW        201248530 A1    12/2012

OTHER PUBLICATIONS

Office Action to the corresponding Taiwan Patent Application No. 103123223 rendered by Taiwan Intellectual Property Office (TIPO) on Jul. 31, 2015, 10 pages (including English translation).

*Primary Examiner* — Sarah Su
(74) *Attorney, Agent, or Firm* — Skaar Ulbrich Macari, P.A.

(57) ABSTRACT

A server, a user apparatus and a terminal device are provided. The server includes a transmission interface, a database and a processor. The transmission interface receives an identification verification request from the user apparatus. The processor captures a plurality of selected patterns from a plurality of database patterns stored in the database according to the identification verification request, selects at least one target pattern from the plurality of selected patterns, and enables the user apparatus to display the plurality of selected patterns and the at least one target pattern in a match object area and a target object area of a user interface displayed by the user apparatus, respectively. An identification verification procedure is finished while the processor determines that one of the plurality of selected patterns that corresponds to the at least one target pattern is selected to conform to the at least one target pattern.

21 Claims, 7 Drawing Sheets

(56) References Cited

U.S. PATENT DOCUMENTS

| | | | | |
|---|---|---|---|---|
| 2013/0298195 A1* | 11/2013 | Liu | ................... | G06F 17/30247 |
| | | | | 726/3 |
| 2014/0123258 A1* | 5/2014 | Guerrero | ............... | G06F 3/0488 |
| | | | | 726/7 |
| 2015/0012988 A1* | 1/2015 | Jeng | ........................ | G06F 21/36 |
| | | | | 726/7 |
| 2015/0371079 A1* | 12/2015 | Kohlenberg | ............ | G06F 21/31 |
| | | | | 348/77 |

* cited by examiner

SERVER, USER APPARATUS AND TERMINAL DEVICE

PRIORITY

This application claims priority to Taiwan Patent Application No. 103123223 filed on Jul. 4, 2014, which is hereby incorporated by reference herein in its entirety.

FIELD

The present invention relates to a server, a user apparatus and a terminal device. More particularly, the server, the user apparatus and the terminal device of the present invention provide a verification method that is commercialized and interesting and that can provide commercial information or user information for the user after a successful verification process.

BACKGROUND

As the network technologies advance rapidly nowadays, the verification code mechanism that allows a user to read data safely has become indispensable.

The Completely Automated Public Turing test to tell Computers and Humans Apart (CAPTCHA) mechanism is generally known as the verification code mechanism. Through the CAPTCHA mechanism, a system, a terminal device or the like can tell whether a current user is a machine or a human being.

The current verification systems mainly employ combinations of letters, and specifically, the verification procedure is accomplished by a human being who identifies a combination of letters and then inputs the same combination of letters. However, the verification codes generated by use of combinations of letters are very uninteresting and complicated for the user.

Accordingly, an urgent need exists in the art to provide a verification system that is interesting and meaningful to the user.

SUMMARY

An objective of the present invention includes providing a verification method that is interesting and meaningful to the user and capable of improving the user's experiences and the commercial value, and to apply this method to a server, a user apparatus and a terminal device.

Disclosed is a server, which comprises a transmission interface, a database and a processor. The transmission interface communicates with a user apparatus via a network and is configured to receive a verification request from the user apparatus. The database is configured to store a plurality of database patterns, wherein each of the database patterns is one of an icon, an image, a content and a film. The processor is electrically connected with the transmission interface and the database and is configured to execute a verification procedure which comprises the following steps: enabling the processor to retrieve a selected pattern set from the database patterns stored in the database according to the verification request, wherein the selected pattern set comprises a first selected pattern and a second selected pattern; enabling the processor to select one of the first selected pattern and the second selected pattern from the selected pattern set as an as-selected pattern, and to select the as-selected pattern as a first target pattern; enabling the processor to enable a display screen of the user apparatus to display a user interface, wherein the user interface comprises a match object area and a target object area, and the selected pattern set is displayed in the match object area and the first target pattern is displayed in the target object area; and enabling the processor to determine that the verification procedure is finished when the as-selected pattern in the match object area of the display screen is selected to conform to the first target pattern. A content of the first target pattern is related to a piece of specific information.

Further disclosed is a user apparatus, which comprises a transmission interface and a display screen. The transmission interface communicates with a server via a network and is configured to transmit a verification request to the server and receive a display instruction from the server. The display screen is electrically connected with the transmission interface and is configured to display a user interface according to the display instruction, wherein the user interface comprises a match object area and a target object area, the display screen displays a selected pattern set in the match object area, the selected pattern set comprising a first selected pattern and a second selected pattern, and displays a first target pattern in the target object area, wherein the first target pattern is generated by selecting one of the first selected pattern and the second selected pattern as an as-selected pattern and using the as-selected pattern to be the first target pattern. The selected pattern set is retrieved from a plurality of database patterns stored in a database, each of the database patterns is one of an icon, an image, a content and a film, and a content of the first target pattern is related to a piece of specific information. A verification procedure is finished when the server determines that the as-selected pattern in the match object area of the display screen is selected to conform to the first target pattern.

Additionally disclosed is a terminal device, which comprises an input interface, a database, a display screen and a processor. The input interface is configured to receive a verification request from a user. The database is configured to store a plurality of database patterns, wherein each of the database patterns is one of an icon, an image, a content and a film. The processor is electrically connected with the input interface, the database and the display screen and is configured to execute a verification procedure which comprises the following steps: enabling the processor to retrieve a selected pattern set from the database patterns stored in the database according to the verification request, wherein the selected pattern set comprises a first selected pattern and a second selected pattern; enabling the processor to select one of the first selected pattern and the second selected pattern from the selected pattern set as an as-selected pattern, and to use the as-selected pattern to be a first target pattern; enabling the processor to enable the display screen to display a user interface, wherein the user interface comprises a match object area and a target object area, and the selected pattern set is displayed in the match object area and the first target pattern is displayed in the target object area; and enabling the processor to determine that the verification procedure is finished when the as-selected pattern in the match object area of the display screen is selected to conform to the first target pattern; wherein a content of the first target pattern is related to a piece of specific information.

The detailed technology and preferred embodiments implemented for the subject invention are described in the following paragraphs accompanying the appended drawings for people skilled in this field to well appreciate the features of the claimed invention.

DETAILED DESCRIPTION

Hereinbelow, the certain embodiments of the invention will be explained with reference to example embodiments thereof. It should be appreciated that, these example embodiments are not intended to limit the present invention to any specific examples, embodiments, environment, applications or implementations as described in these example embodiments. Therefore, description of these example embodiments is only for purpose of illustration rather than to limit the present invention, and the scope of this application shall be governed by the claims.

In the following embodiments and drawings, elements not directly related to the present invention are omitted from depiction; and dimensional relationships among individual elements in the following drawings are illustrated only for ease of understanding but not to limit the actual scale.

Figure 1A:
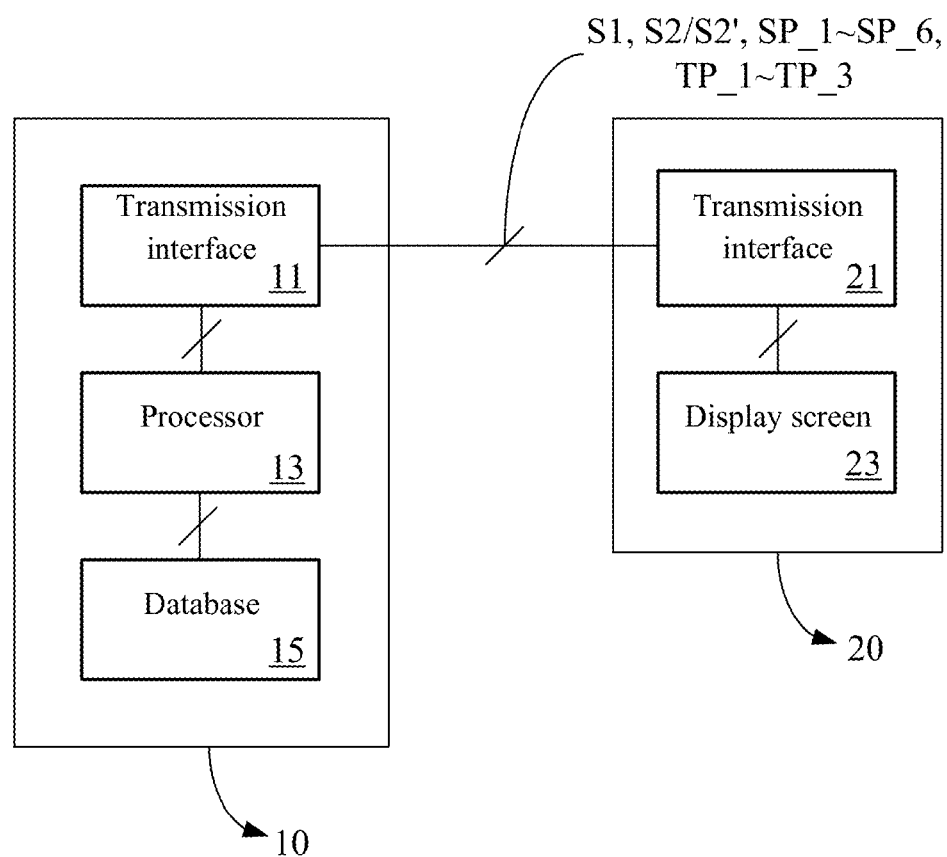
FIG. 1A is a functional block diagram of a server and a user apparatus according to a first embodiment of the present invention.

Referring to FIGS. 1A-1E, a server 10 and a user apparatus 20 according to a first embodiment of the present invention are shown therein. FIG. 1A depicts a functional block diagram of the server 10 and the user apparatus 20, and FIGS. 1B-1E illustrate contents displayed by a display screen 23 of the user apparatus 20. As shown in FIG. 1A, the server 10 may be a webpage server or other accessing servers, and comprises a transmission interface 11, a processor 13 and a database 15. The processor 13 is electrically connected with the transmission interface 11 and the database 15 respectively. The database stores a plurality of database patterns, each of which may be an icon, an image, a content or a film.

The user apparatus 20 may be a smart phone, a tablet computer, a desktop computer, a notebook computer, a wearable electronic device, a household appliance (e.g., a television set) that communicates with the server 10 via the internet of things, a terminal device for the internet of things, a vehicle-mounted electronic operating system (e.g., a global positioning system (GPS) navigator) and etc., and comprises a transmission interface 21 and a display screen 23. The transmission interface 21 is electrically connected with the display screen 23. The transmission interface 11 of the server 10 communicates with the transmission interface 21 of the user apparatus 20 via a network (e.g., a wired network or a wireless network, an internet or a telecommunication network or etc.).

When a user has a need for verification, the user apparatus 20 transmits a verification request S1 to the server 10 via the transmission interface 21 thereof.

The verification request S1 may be triggered when the user is to access a website, an apparatus (e.g., a mobile device, a portable electronic apparatus, a wearable device or a stationary apparatus) or execute a logon procedure or in any cases where conventionally a verification code shall be used.

For example, when a user browses an e-mail website via the user apparatus 20 and wants to login with the user's e-mail account, the user may click a button such as a "Login" button, and a signal corresponding to the click is therefore transmitted from the user apparatus 20 to the server 10 via the transmission interface 21. The signal corresponding to the click is the verification request S1 of this embodiment.

For another example, when a user submits data, documents or files to the server 10 or another server which communicates with the server 10 via the user apparatus 20, the user may click a button such as a "Submit" button, and a signal corresponding to the click is therefore transmitted from the user apparatus 20 to the server 10 via the transmission interface 21. The signal corresponding to the click is the verification request S1 of this embodiment.

For another example, when a user would like to browse a webpage via the user apparatus 20 and an authorization procedure should be done before browsing the webpage. When the user presses or click any button for browsing the webpage and then the user apparatus 20 accordingly generates a signal which will be sent to the server 10 via the transmission interface 21. The signal corresponding to the press or the click is the verification request S1 of this embodiment.

Figure 1B:
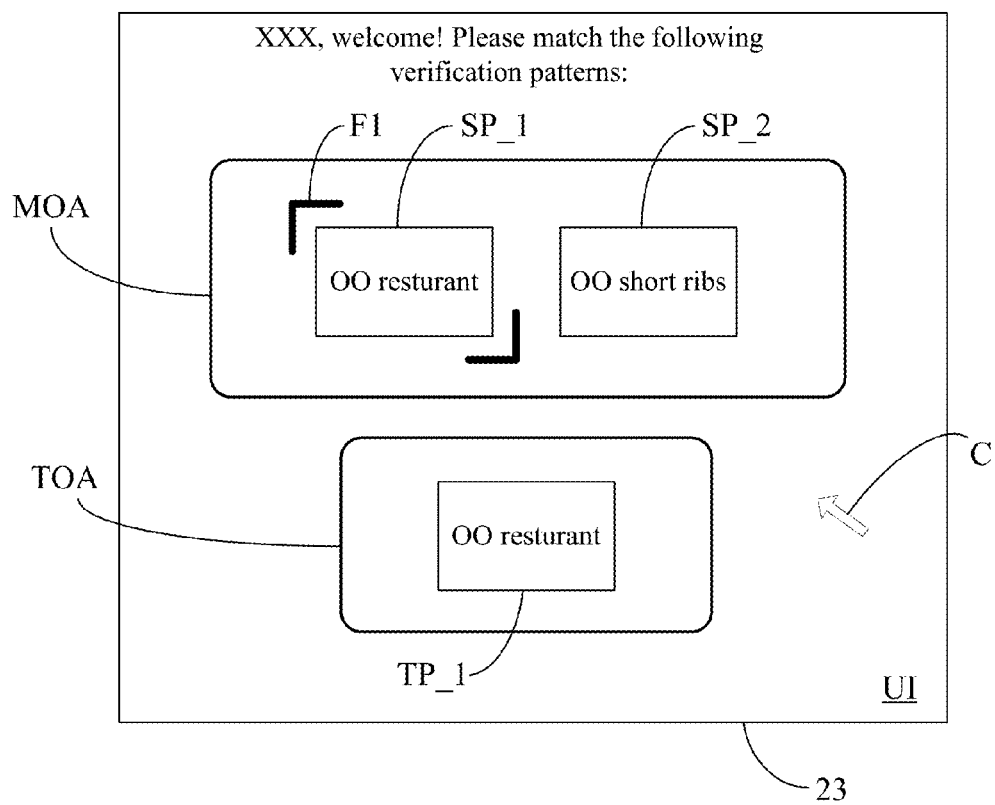
FIGS. 1B-1E illustrate contents displayed by a display screen of the user apparatus according to the first embodiment of the present invention.

The server 10 enables the processor 13 to execute a verification procedure after the verification request S1 is received by the transmission interface 11. The verification procedure comprises the following steps: enabling the processor 13 to select a selected pattern set S2 from the database patterns stored in the database 15 according to the verification request S1, where the selected pattern set S2 comprises a first selected pattern SP_1 and a second selected pattern SP_2; and enabling the processor 13 to select one of the first selected pattern SP_1 and the second selected pattern SP_2 from the selected pattern set S2 as an as-selected pattern, and to use the as-selected pattern to be a first target pattern TP_1. For ease of description, the as-selected pattern is illustrated as the first selected pattern SP_1 in this embodiment; that is, in this embodiment, the processor 13 selects the first selected pattern SP_1 from the selected pattern set S2 as the as-selected pattern. Of course, the processor 13 may also select the second selected pattern SP_2 as the as-selected pattern. Furthermore, the verification procedure further comprises the following step: enabling the processor 13 to enable the display screen 23 of the user apparatus 20 to display a user interface UI. The user interface UI comprises a match object area MOA and a target object area TOA. As shown in FIG. 1B, the selected pattern set S2 (i.e., the first selected pattern SP_1 and the second selected pattern SP_2) is displayed in the match object area MOA, and the first target pattern TP_1 is displayed in the target object area TOA. A content of the first target pattern TP_1 is related to a piece of specific information.

The specific information is related to a brand logo, a trademark, a brand product, a brand slogan, a piece of user information, an enterprise profile, a personal profile, or other introductions related to the advertisement or etc.

The aforesaid selected pattern set S2 may be retrieved randomly from the database patterns, or may be retrieved from the database patterns corresponding to at least one of a local time, a current region, a user data, big data and its analytic outcome. As illustrated in FIG. 1A, if the user uses a verification method of the present invention at dinner time, the server 10 retrieves the trademark of a certain "OO restaurant" and a classical meal "OO short ribs" of the "OO restaurant" as the first selected pattern SP_1 and the second selected pattern SP_2 according to the dinner time. The processor 13 may select the as-selected pattern from the selected pattern set S2 to be the first target pattern TP_1 randomly or by using the data related to the user (e.g., the location of the user).

There are several manners in which the selected pattern set S2 and the first target pattern TP_1 are displayed. For example, in order to avoid the aforesaid patterns from being identified and selected by a machine using the optical character recognition (OCR), the present invention further provides a pattern morphing procedure to morph the aforesaid patterns. For example, the pattern morphing procedure can directly twist and display at least one of the first selected pattern SP_1, the second selected pattern SP_2 and the first target pattern TP_1.

Figure 1C:
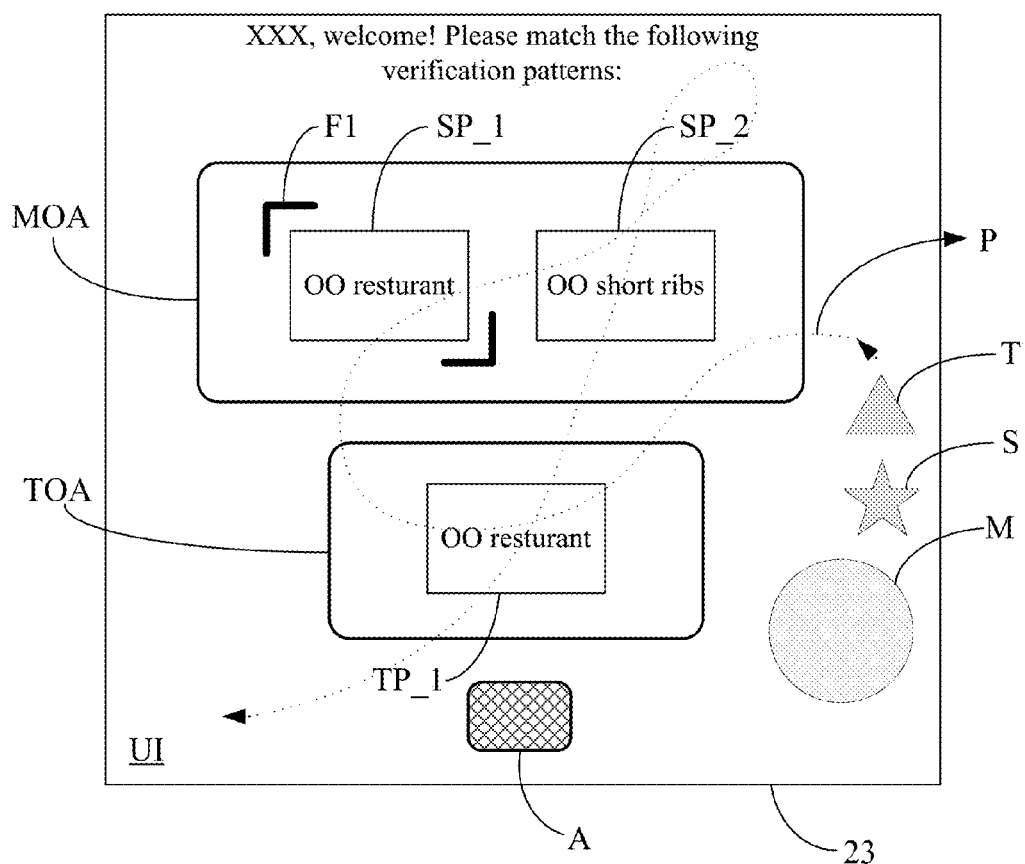

Or, as shown in FIG. 1C, the processor 13 enables the display screen 23 to further display a graphic object, e.g., a triangular object T, a star-shape object S or a magnifying glass frame M. The graphic object or the magnifying glass frame M can cover or scale the first selected pattern SP_1, the second selected pattern SP_2 and the first target pattern TP_1 partially or wholly along a path P so that the objective of visually morphing these patterns can be achieved.

Furthermore, the first selected pattern SP_1 and the second selected pattern SP_2 may be displayed in the match object area MOA simultaneously or at different times. In both the embodiments illustrated in FIG. 1B and FIG. 1C, the first selected pattern SP_1 and the second selected pattern SP_2 are displayed in the match object area MOA simultaneously. However, as an alternative, the first selected pattern SP_1 and the second selected pattern SP_2 may also be displayed at different times respectively. For example, the match object area MOA or the target object area TOA may also comprise a display box. The patterns are movable, and only the part of a pattern that is moved into the display box can be displayed clearly and the other patterns or parts of the pattern that are not moved into the display box are not displayed or are displayed in faded lines.

Otherwise, in another embodiment, either of the pattern that moved into the display box and the other patterns or parts of the pattern that are not moved into the display box are both display clearly.

Figure 1D:
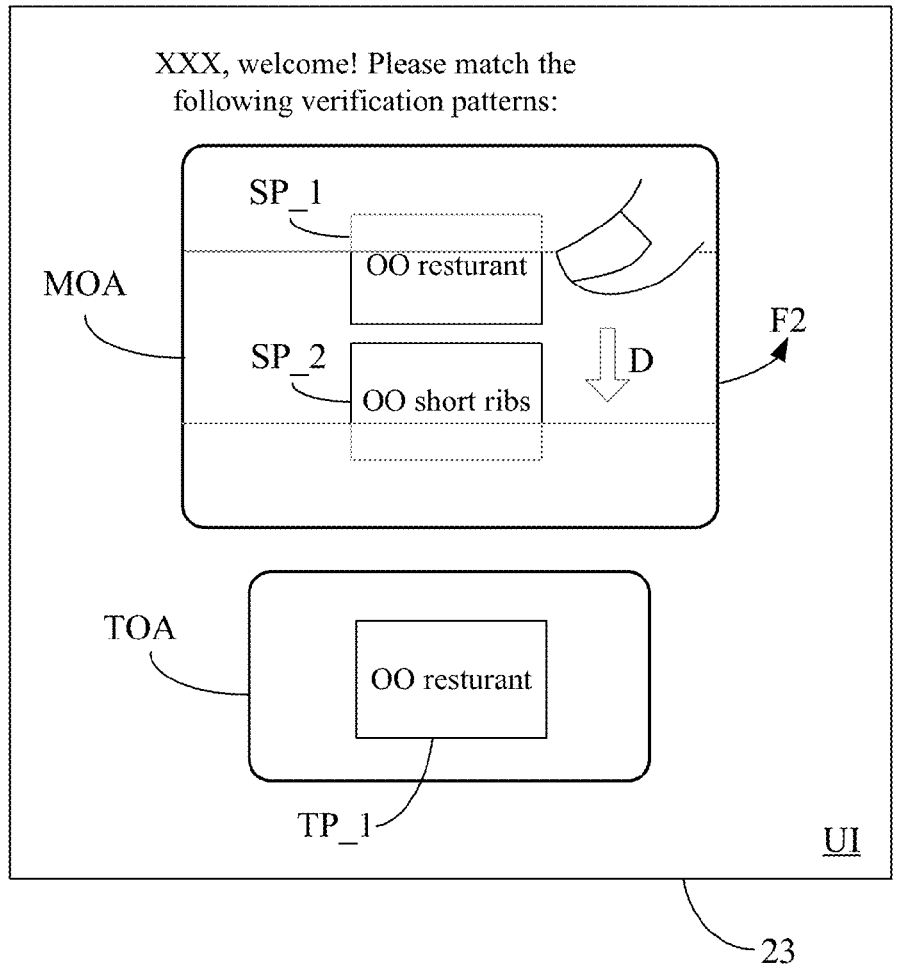

For example, as shown in FIG. 1D, the first selected pattern SP_1 and the second selected pattern SP_2 of the selected pattern set S2 are moved into a display box F2 by sliding with a user's finger or by sliding a mouse cursor or a touch pen (commending device) or motion command according to a user's instruction so that the first selected pattern SP_1 and the second selected pattern SP_2 can be displayed in the display box F2. Suppose that it is the second selected pattern SP_2 that is originally displayed in the match object area MOA and the first selected pattern SP_1 is located above the second selected pattern SP_2 and is displayed in a faded manner. Then in order to select the first selected pattern SP_1 (i.e., the as-selected pattern), the user will slide the display box F2 in a direction D with his or her finger so that the first selected pattern SP_1 (e.g., the as-selected pattern) is displayed in the display box F2.

However, the present invention is not limited thereto. The first selected pattern SP_1 and the second selected pattern SP_2 in the display box F2 may also be moved in a horizontal direction besides in a vertical direction. Furthermore, the first selected pattern SP_1 and the second selected pattern SP_2 may, according to different displaying manners, be moved in an oblique direction or an arc direction besides in the vertical direction or the horizontal direction. For example, if the first selected pattern SP_1 and the second selected pattern SP_2 are arranged diagonally (e.g., at an upper left position and a lower right position respectively), then the first selected pattern SP_1 and the second selected pattern SP_2 may be moved in an oblique direction. Supposing that there are more than three other selected patterns, the first selected pattern SP_1 and the second selected pattern SP_2 and the more than three other selected patterns may be arranged along a circumference, and may be moved in the display box in an arc direction. However, the present invention is not limited thereto. The display box F2 may be in any form and the selected patterns may also be arranged in any manner, and any operation manners of moving the display picture according to the form of the display box F2 and/or the arrangement of the selected patterns shall all fall within the scope of the present invention.

The verification procedure further comprises the following steps: enabling the processor 13 to enable the first selected pattern SP_1 in the match object area MOA of the display screen 23 to be selected to conform to the first target pattern TP_1 (the as-selected pattern), thus finishing the verification procedure; and the processor 13 also enables the display screen 23 to display a page of a procedure to be performed in a next stage. Or, after the first target pattern TP_1 (the as-selected pattern) is selected, the match object area MOA and the target object area TOA may disappear, and the processor 13 further enables the display screen 23 to display a user communication message. The user communication message may be an advertisement related to the first target pattern TP_1, a linked website, a promotion message, and a coupon/certificate/quick response code (QR code) available for downloading and/or for use that is intended for marketing and/or for use by the user. However, the present invention is not limited thereto, and any messages that can be provided to the user for subsequent use are included in the present invention.

The first selected pattern SP_1 (the as-selected pattern) may be selected in the following manners. In terms of the selecting medium, the first selected pattern SP_1 may be selected with a cursor C that is displayed on the user interface UI under the control of a mouse, a touch pen (commending device) or montion command, a finger, a stylus, or a specific button or switch on the user apparatus 20. Or, the user apparatus 20 may also select the first selected pattern SP_1 by using a voice instruction.

As shown in FIG. 1C, a radio box F1 is displayed in the match object area MOA according to a voice instruction. The radio box F1 can move in a horizontal direction or a vertical direction according to the voice instruction of the user, and when the radio box F1 has moved to the area in which the first selected pattern SP_1 to be selected is located, the user can give a voice instruction "selecting" to select the pattern.

There are several schemes of selecting the first target pattern TP_1 to conform to the first selected pattern SP_1, which are as follows: clicking the first selected pattern SP_1 (the as-selected pattern) in the match object area MOA and then clicking the first target pattern TP_1 in the target object area TOA; clicking the first target pattern TP_1 in the target object area TOA and then clicking the first selected pattern SP_1 (the as-selected pattern) in the match object area MOA; directly clicking the first selected pattern SP_1 (the as-selected pattern) in the match object area MOA; dragging the first selected pattern SP_1 (the as-selected pattern) in the match object area MOA to the first target pattern TP_1 in the target object area TOA to overlap at least a half of the first target pattern TP_1, and/or until the dragging of the first selected pattern SP_1 has been stopped; and dragging the first selected pattern SP_1 (the as-selected pattern) in the match object area MOA to a pairing area A corresponding to the first target pattern TP_1 (e.g., as illustrated in FIG. 1C). The selecting procedure is finished as long as the user completes any one of the above selecting schemes.

Of course, if the display box shown in FIG. 1D is used for displaying, the first selected pattern SP_1 (the as-selected pattern) may also be automatically or manually selected when it is moved into the display box F2 by the user.

Figure 1E:
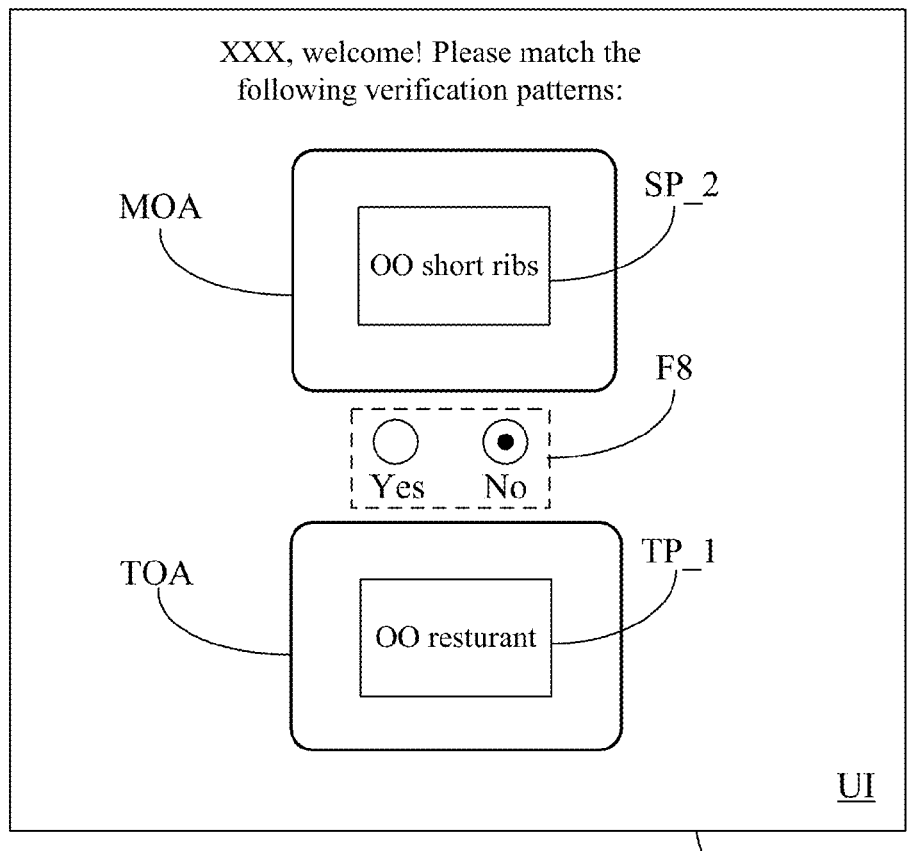

Furthermore, in the present invention, the user may also determine whether each of the selected patterns matches the target pattern one by one to perform the selecting procedure. Specifically, as shown in FIG. 1E, if the display screen 23 firstly displays the second selected pattern SP_2 in the match object area MOA and the user interface UI further comprises a determining area F8, then the user selects the word "Yes" in the determining area F8 if he or she determines that the selected pattern displayed in the match object area MOA is identical to the target pattern displayed in the target object area TOA or selects the word "No" in the determining area F8 if otherwise. A next selected pattern will then be displayed in the match object area MOA after a correct selecting is performed. However, the displaying manner is not limited thereto. The word "Yes" in the determining area F8 may also be replaced with similar words such as "Agreed", "Matched" or etc., and the word "No" in the determining area F8 may also be replaced with similar words such as "Disagreed", "Unmatched" or etc. It should be appreciated that, under the premise of this selecting scheme, the first selected pattern SP_1 and the second selected pattern SP_2 are displayed in the match object area MOA at different times respectively.

It should be particularly appreciated that, if the user makes any mistake in the selecting process of any of the selecting schemes described above, the processor 13 would display a second selected pattern set and then select one or more target patterns therefrom. The second selected pattern set and the one or more target patterns thereof may be retrieved and selected for spare use at the same time when the selected pattern set S2 is selected, or may be retrieved and selected in real time when the user makes a mistake in the selecting process.

Figure 2:
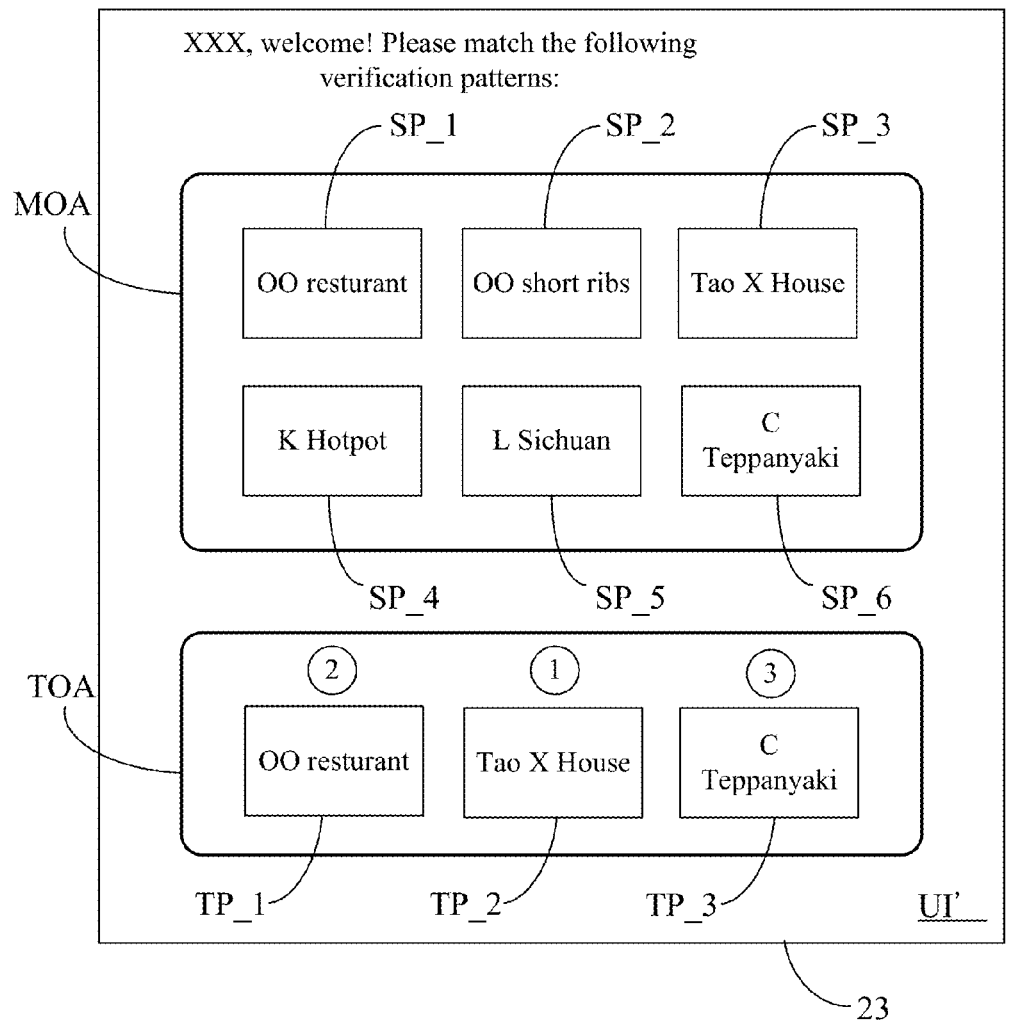
FIG. 2 illustrates a user interface displayed by a display screen of a user apparatus according to a second embodiment of the present invention.

Refer to FIG. 1A and FIG. 2 together for a second embodiment of the present invention is shown. FIG. 2 describes the display screen 23 of the user apparatus 20. A server and a user apparatus mentioned in the second embodiment have the same properties and elements as those of the server 10 and the user apparatus 20 of the first embodiment, and can execute all operations that can be executed by the server 10 and the user apparatus 20 of the first embodiment, including: retrieving the selected pattern set S2, selecting one or more target patterns, how the user interface UI is displayed, how the pattern morphing procedure is performed, how the user communication message is implemented, the selecting medium and the selecting manner and etc. Therefore, the following description will only focus on the differences of the second embodiment from the first embodiment.

In this embodiment, an implementation in which there are more than two target patterns in the target object area TOA is mainly described. As shown in FIG. 2, suppose that the processor 13 retrieves six patterns from the database patterns stored in the database 15 as a selected pattern set S2' which comprises a first selected pattern SP_1, a second selected pattern SP_2, a third selected pattern SP_3, a fourth selected pattern SP_4, a fifth selected pattern SP_5 and a sixth selected pattern SP_6, and the processor 13 also enables the display screen 23 to display the selected pattern set S2' in the match object area MOA of the user interface UI.

The processor 13 further selects one of the first selected pattern SP_1, the second selected pattern SP_2, the third selected pattern SP_3, the fourth selected pattern SP_4, the fifth selected pattern SP_5 and the sixth selected pattern SP_6 that are comprised in the selected pattern set S2' as the as-selected pattern. In this embodiment, for example, the first selected pattern SP_1 is selected as the as-selected pattern and also as the first target pattern TP_1, and one of the first selected pattern SP_1~the sixth selected pattern SP_6 other than the first selected pattern SP_1 (the as-selected pattern) is selected as a second as-selected pattern. In this embodiment, for example, the third selected pattern SP_3 is selected as the second as-selected pattern and also as a second target pattern TP_2, and one of the first selected pattern SP_1~the sixth selected pattern SP_6 other than the first selected pattern SP_1 (the as-selected pattern) and the third as-selected pattern SP_3 (the second as-selected pattern)) is selected as a third as-selected pattern. In this embodiment, for example, the sixth selected pattern SP_6 is selected as the third as-selected pattern and also as the third target pattern TP_3. The processor 13 enables the display screen 23 to display the first target pattern TP_1, the second target pattern TP_2 and the third target pattern TP_3 in the target object area TOA of the user interface UI.

However, this embodiment is not limited thereto, and the patterns of the selected pattern set S2' as well as the number of the target patterns are only provided for purpose of illustration rather than to limit this embodiment. For example, the selected pattern set may also comprise three or more patterns and the number of the target patterns may also be two or more.

In this embodiment, because there are three target patterns in the target object area TOA, the processor 13 further provides an instruction sequence. The instruction sequence may be displayed in the user interface UI, and instructs the user to, according to the sequence of the first target pattern TP_1 to the third target pattern TP_3 that are arranged in the target object area TOA (e.g., from left to right or from right to left), sequentially select the first selected pattern SP_1 (the as-selected pattern), the third selected pattern SP_3 (the second as-selected pattern) and the sixth as-selected pattern SP_6 (the third as-selected pattern) in the match object area MOA corresponding to the first target pattern TP_1, the second target pattern TP_2 and the third target pattern TP_3 respectively.

Alternatively, the processor 13 may also provide a random sequence as the instruction sequence, such as the random sequence □, □ and □ shown in FIG. 2. Then, the user must firstly select the third selected pattern SP_3, then select the first selected pattern SP_1, and finally select the sixth selected pattern SP_6 in order to make the verification successful.

Furthermore, when there are more than two selected patterns in the match object area MOA or more than two target patterns in the target object area TOA, the selected patterns or the target patterns may be displayed in the form of a film. In the implementation where the target patterns are displayed in the form of a film, the user needs to select the selected patterns according to the displaying sequence of the target patterns displayed in the form of a film. It should be appreciated that, when the selected patterns or the target patterns are displayed in the form of a film, the displaying time is different for each of the selected patterns or each of the target patterns by sequence or random way.

In addition to the above descriptions, the server and the user apparatus of the second embodiment can also execute all operations and functions of the server and the user apparatus of the first embodiment. How the server and the user apparatus of the second embodiment execute these operations and functions will be readily appreciated by those of ordinary skill in the art based on the explanation of the first embodiment, and thus will not be further described again.

Figure 3:
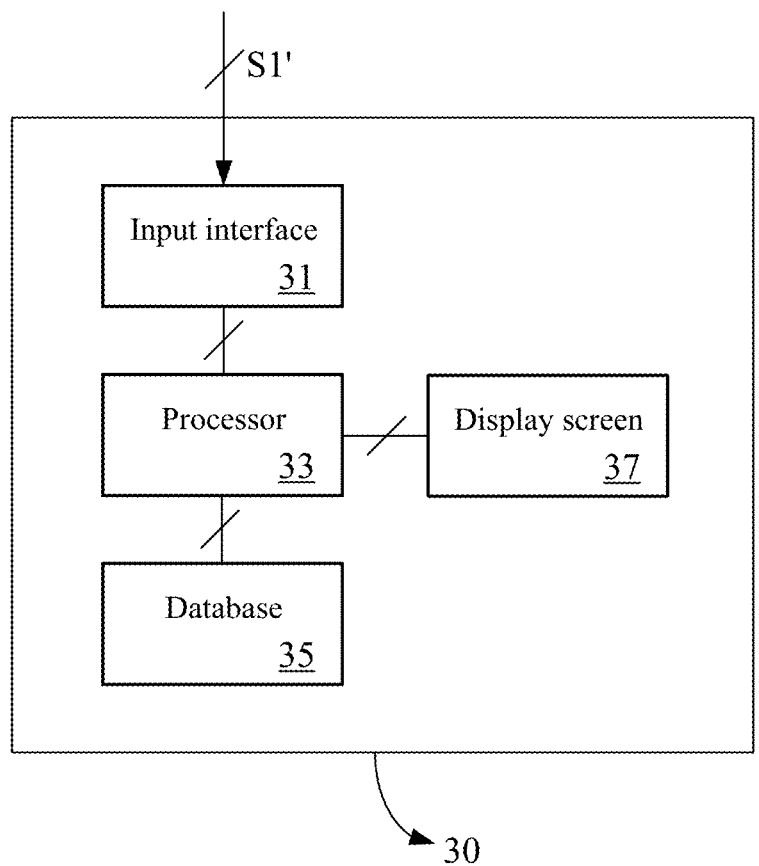
FIG. 3 is a functional block diagram of a terminal device according to a third embodiment of the present invention.

A terminal device 30 according to a third embodiment of the present invention is shown in FIG. 3, which depicts a functional block diagram of the terminal device 30. The terminal device 30 comprises an input interface 31, a processor 33, a database 35 and a display screen 37. The processor 33 is electrically connected with the input interface 31, the database 35 and the display screen 37 respectively.

It should be appreciated that, the terminal device 30 of this embodiment is a terminal hardware device formed by integrating the server 10 and the user apparatus 20 in the first embodiment together, and the terminal device 30 may be such a device as an automated teller machine (ATM), a terminal server or the like.

Furthermore, the function of the input interface 31 of the terminal device 30 of this embodiment is similar to that of the transmission interface 11 of the first embodiment, and both are used to receive a verification request. However, the difference therebetween is that: in the first embodiment, the verification request S1 received by the transmission interface 11 is generated by the user apparatus 20; but in this embodiment, the verification interface S1' received by the input interface 31 is generated when the user triggers a certain function (e.g., an identity verification function) of the terminal device 30.

The functions of the processor 33 and the database 35 of this embodiment are the same as those of the processor 13 and the database 15 of the server 10 of the first embodiment, and the function of the display screen 37 of this embodiment is the same as that of the display screen 23 of the first embodiment except that, the processor 13 and the display screen 23 need not rely on any transmission interface (e.g., a network) to communicate with each other or to execute functions therebetween, but can directly communicate with each other through the electrical connection therebetween. The elements of this embodiment can also execute the functions or play the roles of their respective corresponding elements of the second embodiment, although the present invention is not limited thereto.

The above invention is related to the detailed technical contents and inventive features thereof. People skilled in this field may proceed with a variety of modifications and replacements based on the inventions and suggestions of the invention as described without departing from the characteristics thereof. Nevertheless, although such modifications and replacements are not fully disclosed in the above descriptions, they have substantially been covered in the following claims as appended.

What is claimed is:

1. A server, comprising:
   a transmission interface, communicating with a user apparatus via a network and being configured to receive a verification request from the user apparatus;
   a database, being configured to store a plurality of database patterns, wherein each of the database patterns is one of an icon, an image, a content and a film; and
   a processor electrically connected with the transmission interface and the database, being configured to execute a verification procedure which includes:
      the processor retrieving a selected pattern set from the database patterns stored in the database according to the verification request, wherein the selected pattern set comprises a first selected pattern and a second selected pattern;
      the processor selecting one of the first selected pattern and the second selected pattern from the selected pattern set as an as-selected pattern, using the as-selected pattern to be a first target pattern, and selecting, as a second as-selected pattern, the other of the first selected pattern and the second selected pattern than the as-selected pattern that is used as the first target pattern, and uses the second as-selected pattern as a second target pattern;
      the processor causing a display screen of the user apparatus to display a user interface, wherein the user interface comprises a match object area and a target object area, and the selected pattern set is displayed in the match object area, and the first target pattern and the second target pattern are displayed in the target object area; and
      the processor determining that the verification procedure is finished when the as-selected pattern in the match object area of the display screen is selected to conform to the first target pattern, and the second as-selected pattern in the match object area of the display screen is selected to conform to the second target pattern;
   wherein a content of the first target pattern and the second target pattern are related to a piece of specific information.

2. The server as claimed in claim 1, wherein when the display screen displays the selected pattern set and the first target pattern, the processor further enables the display screen to perform a pattern morphing procedure on at least one of the selected pattern set and the first target pattern so as to visually morph at least one of the selected pattern set and the first target pattern partially or wholly.

3. The server as claimed in claim 1, wherein the as-selected pattern is selected in one of the following manners:
   dragging the as-selected pattern in the match object area to the first target pattern in the target object area to overlap at least a half of the first target pattern;
   dragging the as-selected pattern in the match object area to a pairing area corresponding to the first target pattern;
   clicking the as-selected pattern in the match object area and then clicking the first target pattern in the target object area;
   clicking the first target pattern in the target object area and then clicking the as-selected pattern in the match object area; and
   clicking the as-selected pattern in the match object area.

4. The server as claimed in claim 1, wherein the specific information is related to at least one of a brand logo, a trademark, a brand product, a brand slogan, and a piece of user information, and the selected pattern set is retrieved from the database patterns according to at least one of a local time, a current region, and a user data.

5. The server as claimed in claim 4, wherein
   the first target pattern and the second target pattern are sequentially displayed in the target object area in the form of a film.

6. The server as claimed in claim 4, wherein
the as-selected pattern and the second as-selected pattern are selected according to an instruction sequence.

7. The server as claimed in claim 1, wherein the match object area further comprises a display box, and the selected pattern set is displayed in the display box in a sliding manner according to a user's instruction.

8. A user apparatus, comprising:
a transmission interface, communicating with a server via a network and being configured to transmit a verification request to the server and receive a display instruction from the server; and
a display screen, electrically connected with the transmission interface, being configured to display a user interface according to the display instruction, wherein the user interface comprises a match object area and a target object area, the display screen displays a selected pattern set in the match object area, the selected pattern set comprising a first selected pattern and a second selected pattern, and displays a first target pattern and a second target pattern in the target object area, wherein the first target pattern is generated by selecting one of the first selected pattern and the second selected pattern as an as-selected pattern and using the as-selected pattern to be the first target pattern, and the second target pattern is generated by selecting, as a second as-selected pattern, the other of the first selected pattern and the second selected pattern than the as-selected pattern that is used as the first target pattern, and using the second as-selected pattern to be the second target pattern;
wherein the selected pattern set is retrieved from a plurality of database patterns stored in a database, each of the database patterns is one of an icon, an image, a content and a film, and a content of the first target pattern and the second target pattern are related to a piece of specific information; and
wherein the verification procedure is finished when the server determines that the as-selected pattern in the match object area of the display screen is selected to conform to the first target pattern, and the second as-selected pattern in the match object area of the display screen is selected to conform to the second target pattern.

9. The user apparatus as claimed in claim 8, wherein when the display screen displays the selected pattern set and the first target pattern, the display screen further performs a pattern morphing procedure on at least one of the selected pattern set and the first target pattern so as to visually morph at least one of the selected pattern set and the first target pattern partially or wholly.

10. The user apparatus as claimed in claim 8, wherein the as-selected pattern is selected in one of the following manners:
dragging the as-selected pattern in the match object area to the first target pattern in the target object area to overlap at least a half of the first target pattern;
dragging the as-selected pattern in the match object area to a pairing area corresponding to the first target pattern;
clicking the as-selected pattern in the match object area and then clicking the first target pattern in the target object area;
clicking the first target pattern in the target object area and then clicking the as-selected pattern in the match object area; and
clicking the as-selected pattern in the match object area.

11. The user apparatus as claimed in claim 8, wherein the specific information is related to at least one of a brand logo, a trademark, a brand product, a brand slogan, and a piece of user information, and the selected pattern set is retrieved according to at least one of a local time, a current region, and a user data.

12. The user apparatus as claimed in claim 11, wherein the first target pattern and the second target pattern are sequentially displayed in the target object area in the form of a film.

13. The user apparatus as claimed in claim 11, wherein the as-selected pattern and the second as-selected pattern are selected according to an instruction sequence.

14. The user apparatus as claimed in claim 8, wherein the match object area further comprises a display box, and the selected pattern set is displayed in the display box in a sliding manner according to a user's instruction.

15. A terminal device, comprising:
an input interface, being configured to receive a verification request from a user;
a database, being configured to store a plurality of database patterns, wherein each of the database patterns is one of an icon, an image, a content and a film;
a display screen; and
a processor, electrically connected with the input interface, the database, and the display screen, being configured to execute a verification procedure which includes:
the processor retrieving a selected pattern set from the database patterns stored in the database according to the verification request, wherein the selected pattern set comprises a first selected pattern and a second selected pattern;
the processor selecting one of the first selected pattern and the second selected pattern from the selected pattern set as an as-selected pattern, using the as-selected pattern to be a first target pattern, and selecting, as a second as-selected pattern, the other of the first selected pattern and the second selected pattern than the as-selected pattern that is used to be the first target pattern, uses the second as-selected pattern to be a second target pattern;
the processor causing the display screen to display a user interface, wherein the user interface comprises a match object area and a target object area, and the selected pattern set is displayed in the match object area, and the first target pattern and the second target pattern are displayed in the target object area; and
the processor determining that the verification procedure is finished when the as-selected pattern in the match object area of the display screen is selected to conform to the first target pattern and the second as-selected pattern in the match object area of the display screen is selected to conform to the second target pattern;
wherein a content of the first target pattern and the second target pattern are related to a piece of specific information.

16. The terminal device as claimed in claim 15, wherein when the display screen displays the selected pattern set and the first target pattern, the processor further enables the display screen to perform a pattern morphing procedure on the selected pattern set and the first target pattern so as to visually morph at least one of the selected pattern set and the first target pattern partially or wholly.

17. The terminal device as claimed in claim 15, wherein the as-selected pattern is selected in one of the following manners:
   dragging the as-selected pattern in the match object area to the first target pattern in the target object area to overlap at least a half of the first target pattern;
   dragging the as-selected pattern in the match object area to a pairing area corresponding to the first target pattern;
   clicking the as-selected pattern in the match object area and then clicking the first target pattern in the target object area;
   clicking the first target pattern in the target object area and then clicking the as-selected pattern in the match object area; and
   clicking the as-selected pattern in the match object area.

18. The terminal device as claimed in claim 15, wherein the specific information is related to at least one of a brand logo, a trademark, a brand product, a brand slogan, and a piece of user information, and the selected pattern set is retrieved from the database patterns according to at least one of a local time, a current region, and a user data.

19. The terminal device as claimed in claim 18, wherein the first target pattern and the second target pattern are sequentially displayed in the target object area in the form of a film.

20. The terminal device as claimed in claim 18, wherein the as-selected pattern and the second as-selected pattern are selected according to an instruction sequence.

21. The terminal device as claimed in claim 15, wherein the match object area further comprises a display box, and the selected pattern set is displayed in the display box in a sliding manner according to a user's instruction.

* * * * *